US 11,230,185 B2
United States Patent
Conte et al.

(10) Patent No.: US 11,230,185 B2
(45) Date of Patent: Jan. 25, 2022

(54) RESERVE FUEL SYSTEM (71) Applicant: S & J 17, LLC, Fort Wayne, IN (US)

(72) Inventors: Samuel S. Conte, Fort Wayne, IN (US); Jeffrey Britton, Leo, IN (US)

(73) Assignee: S & J 17, LLC, Fort Wayne, IN (US)

( * ) Notice: Subject to any disclaimer, the term of this patent is extended or adjusted under 35 U.S.C. 154(b) by 0 days.

(21) Appl. No.: 17/038,007

(22) Filed: Sep. 30, 2020

(65) Prior Publication Data
US 2021/0094410 A1 Apr. 1, 2021

Related U.S. Application Data (60) Provisional application No. 62/908,911, filed on Oct. 1, 2019.

(51) Int. Cl.
*B60K 15/03* (2006.01)
*B60K 15/06* (2006.01)
*F02M 25/08* (2006.01)
*F02M 21/02* (2006.01)

(52) U.S. Cl.
CPC ........ *B60K 15/03006* (2013.01); *B60K 15/06* (2013.01); *F02M 21/0203* (2013.01); *F02M 21/023* (2013.01); *F02M 21/0224* (2013.01); *F02M 25/0836* (2013.01); *B60K 2015/03144* (2013.01); *B60K 2015/03256* (2013.01)

(58) Field of Classification Search
CPC .............. B60K 15/03006; B60K 15/06; B60K 2015/03256; B60K 2015/03144; B60K 2015/03026; F02M 25/0836; F02M 21/0224; F02M 21/023; F02M 21/0203; Y02T 10/30
See application file for complete search history.

(56) References Cited

U.S. PATENT DOCUMENTS

| 4,403,589 | A | | 9/1983 | Bowen et al. |
| 4,462,418 | A | * | 7/1984 | Xander ................... F15B 21/02 137/106 |
| 5,704,387 | A | * | 1/1998 | Sims ...................... B60K 15/06 137/263 |
| 6,263,916 | B1 | * | 7/2001 | Rumpf ................. B60K 15/061 137/392 |
| 6,279,612 | B1 | * | 8/2001 | Warth .................. B60K 15/013 137/255 |
| 6,527,075 | B1 | | 3/2003 | Izuchukwu et al. |
| 6,886,582 | B2 | | 5/2005 | Choi |
| 9,000,905 | B2 | | 4/2015 | Oxley et al. |
| 9,315,100 | B2 | | 4/2016 | Gentry |
| 9,850,845 | B2 | | 12/2017 | Sloan et al. |
| 2011/0200726 | A1 | * | 8/2011 | Tinkler ............... A47J 31/3676 426/431 |

* cited by examiner

Primary Examiner — Jacob M Amick
Assistant Examiner — Charles J Brauch
(74) Attorney, Agent, or Firm — Faegre Drinker Biddle & Reath LLP (57) ABSTRACT A reserve fuel tank retention and control (RTRC) module and a method of operating a vehicle including an engine and a main fuel tank containing a fuel, the method including mounting the RTRC module onto the vehicle; fluidly connecting the RTRC module to the engine and to the main fuel tank; actuating a valve of the RTRC module for a predetermined time to purge moisture in a fuel supply hose into the engine; and upon the main fuel tank becoming empty, actuating the valve to allow fuel from the reserve fuel tank to supply the engine.

17 Claims, 8 Drawing Sheets

Figure 9

RESERVE FUEL SYSTEM

CROSS-REFERENCE TO RELATED APPLICATIONS

The present application claims priority from and the benefit of U.S. Patent Application No. 62/908,911, filed Oct. 1, 2019, which is incorporated herein by reference in its entirety.

FIELD OF THE DISCLOSURE

The present disclosure relates to reserve fuel tank systems for vehicles, and in particular to reserve fuel tank systems for vehicles with gaseous fuels stored in removable fuel tanks.

BACKGROUND

Many current industrial/commercial vehicles, such as fork trucks, are fueled by pressurized propane gas, contained in onboard fuel systems in the form of replaceable cylindrical fuel tanks connected to the engine by hoses. Said vehicles do not typically carry, nor have provision for, an onboard reserve fuel supply, and therefore the content of the propane tank determines how long the vehicle can continue operating before the propane tank has to be removed and replaced or refilled, which can occur on site or at a refueling station.

If refueling is not anticipated, the vehicles' engine stops running rendering the vehicle inoperable before the mission of the vehicle is completed, i.e., "dead in the aisle", which in addition to costing time can cause a complete lane or aisle blockage with goods-in-transport not delivered. Inoperability during a mission can be disruptive to vital material flow, with costly downtime. In most cases the user-operator dismounts and hand carries the empty fuel tank to a refueling station, then returns with a replacement full tank. This can take 30-60 minutes, during which time the vehicle is immovable, potentially in an inconvenient place.

Further, purging a replacement fuel tank is usually necessary due to the inherent properties of propane fuel, particularly temperature sensitivity-caused condensation that is typical of fuel tank storage. Traditional purging requires manually "valving off" the condensate/contamination, which costs additional time.

SUMMARY OF THE DISCLOSURE

A reserve fuel tank retention and control (RTRC) module for a vehicle having an engine and a main fuel tank supplying fuel to the engine. In some embodiments, the RTRC module includes a fuel supply hose adapted to fluidly connect the RTRC module and the engine, a fuel intake hose adapted to fluidly connect the RTRC module and the main fuel tank, a reserve fuel tank, a first fluid circuit fluidly connecting the fuel supply hose and the fuel intake hose with a first check valve therebetween allowing flow from the fuel intake hose to the fuel supply hose, and a second fluid circuit fluidly connecting the fuel supply hose and the fuel intake hose, the second fluid circuit including a second check valve between the fuel intake hose and the reserve fuel tank and a valve between the reserve fuel tank and the fuel supply hose.

In some variations of the present embodiment, the valve is a solenoid valve activated by an electric switch having a first state and a second state. The first state implements a normal mode of operation in which the engine is supplied from the main fuel tank. The second state implements a reserve mode of operation in which the engine is supplied from the reserve fuel tank. In the first state the valve is closed, permitting fuel to flow in the first fluid circuit from the main fuel tank through the first check valve to the engine. In the second state the valve is open allowing fuel to flow from the reserve fuel tank through the solenoid valve to the engine.

In an example of the foregoing variation, a timer is provided to cause the solenoid valve to close after a predetermined time. The predetermined time is the time the vehicle is permitted to operate on reserve fuel. The predetermined time may be set to enable the vehicle to reach a refueling station without allowing the reserve fuel tank to reach an empty state, defined as a state in which the reserve fuel tank cannot supply fuel to the engine even when the solenoid valve is open. A light may also be provided, which may be connected to the switch to illuminate in the reserve mode of operation.

In some embodiments, a method of operating a vehicle including an engine and a main fuel tank containing a fuel is provided, the method comprising: mounting a reserve fuel tank retention and control (RTRC) module onto the vehicle; fluidly connecting a fuel supply hose of the RTRC module to the engine; fluidly connecting a fuel intake hose of the RTRC module to the main fuel tank; actuating a valve of the RTRC module for a predetermined time to purge moisture in the fuel supply hose into the engine; and upon the main fuel tank becoming empty, actuating the valve for the predetermined time to allow fuel from the reserve fuel tank to supply the engine.

BRIEF DESCRIPTION OF THE DRAWINGS

The present disclosure will now be described in greater detail based on non-limiting exemplary embodiments and with reference to the drawings, on which.

DETAILED DESCRIPTION

Figure 1:
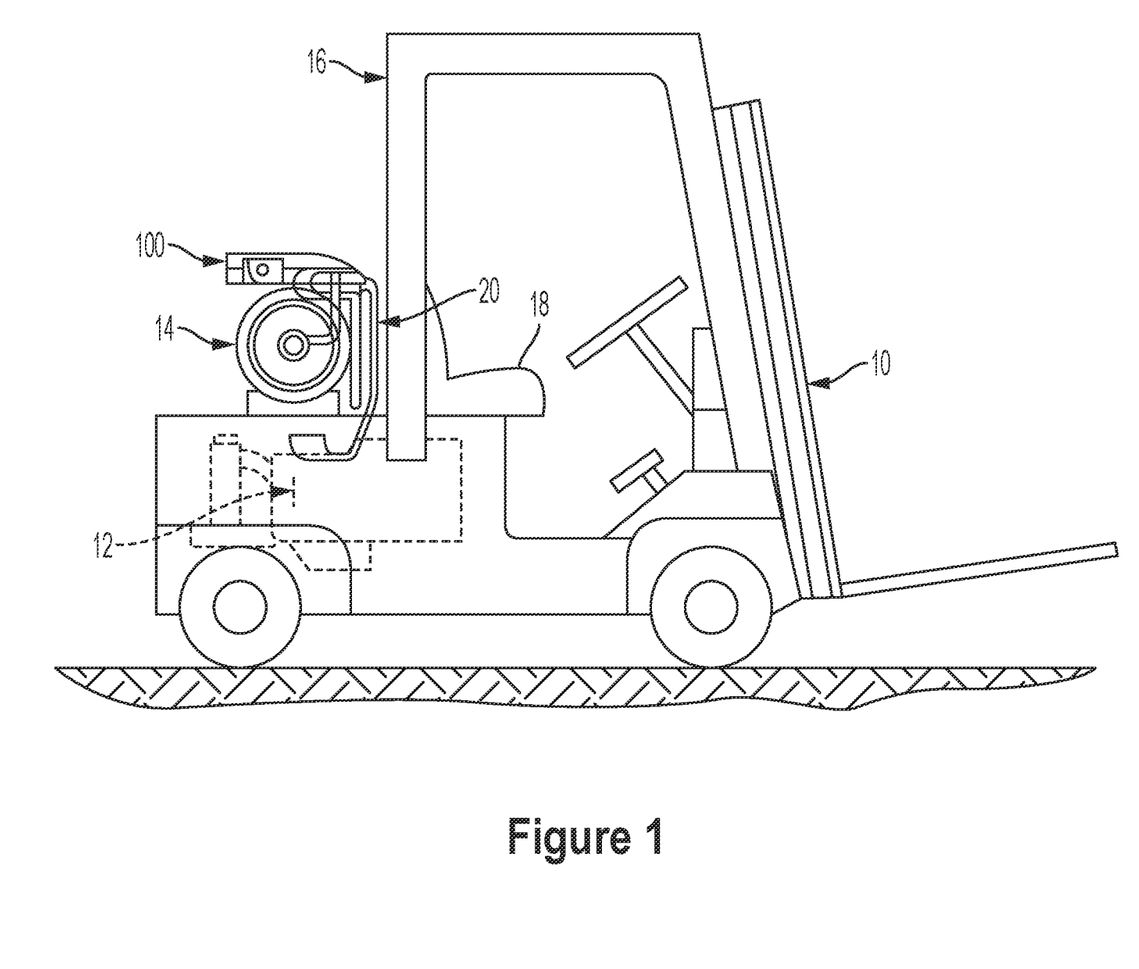
FIG. 1 is a side view of a vehicle including an RTRC module.

Turning first to FIG. 1, an RTRC module 100 is shown mounted on a vehicle 10, e.g. a fork truck, having an engine 12, a main fuel tank 14, a safety cage 16, and a seat 18 for an operator of vehicle 10. Main fuel tank 14 is located behind seat 18 above engine 12. RTRC module 100 is mounted on top of main fuel tank 14 and includes a reserve fuel tank 110 (see FIG. 4). A fuel supply hose 20 fluidly connects RTRC module 100 and engine 12.

RTRC module 100 is removable and substantially portable, meaning that can be easily transported and mounted to a vehicle, and then removed from the vehicle. By "substantially portable" it is meant that the module can be lifted and moved by personnel without use of lifting equipment, although some individuals might not have the physical strength to lift and carry the module by themselves. The RTRC module includes a control circuit designed to facilitate fluid connection of main fuel tank 14 or reserve fuel tank 110 to the engine. Use of FTRC module 100 reduces downtime and increases payback on the vehicle. Additionally, while prior art circuits may be designed to purge condensation to the environment, FTRC module 100 purges directly to the engine. The timed function of valve 146 ensures purging is sufficient.

Although the FTRC module is generally described in the context of a propane powered fork truck, it should be understood that the FTRC module can be used with any vehicle that can be fueled from a reserve tank.

Figure 2:
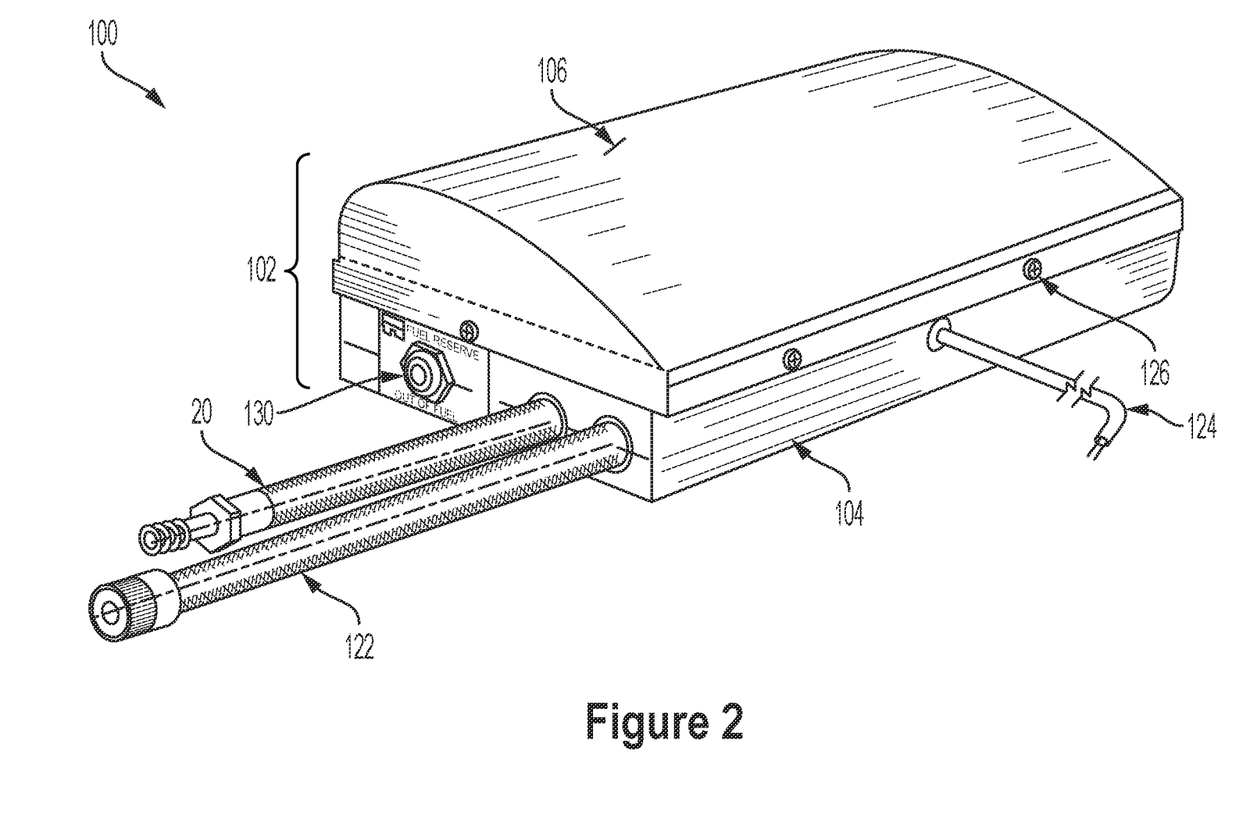
FIG. 2 is a perspective view of an embodiment of the RTRC module of FIG. 1.

Turning now to FIG. 2, RTRC module 100 comprises an enclosure 102 having a base 104 and a lid 106. A control actuator 130, illustratively an electric switch, is located on a side of enclosure 102, preferably on a side of base 104. Hoses 120 and 122 are shown extending from base 104 of enclosure 102. A conduit 124 also extends from base 104 and is connected (not shown) to the battery of the vehicle. A plurality of fasteners 126 secure lid 106 to base 104.

Figure 3:
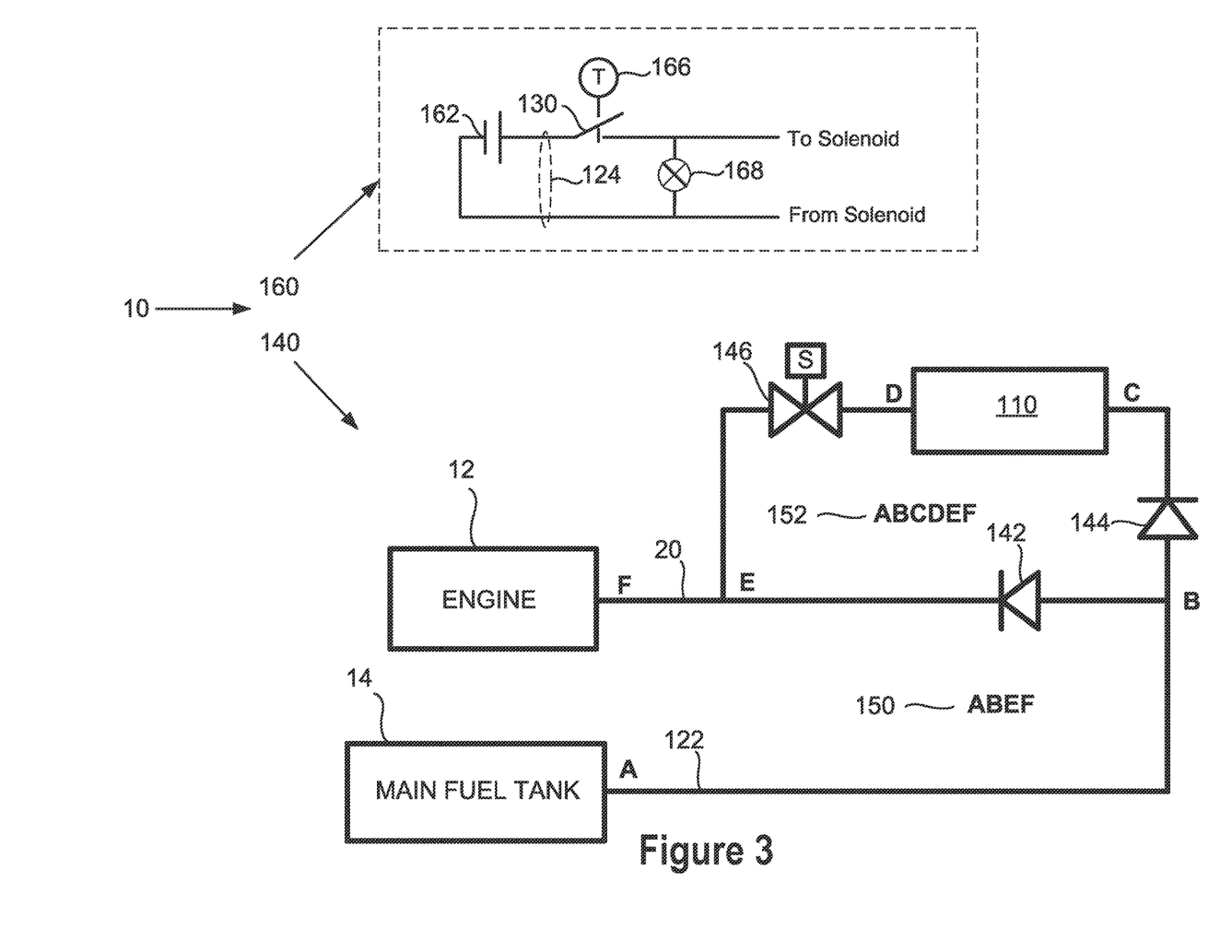
FIG. 3 is a schematic view of electrical and fluid circuits of the FTRC module of FIG. 1.

FIG. 3 is a schematic view of embodiments of fluid and electrical circuits 140, 160, respectively, of FTRC module 100. Fluid circuit 140 comprises a first subcircuit 150 and a second subcircuit 152. First subcircuit 150 extends between junctions ABEF, from fuel intake hose 122 through a first check-valve 142 to fuel supply hose 20.

When first subcircuit 150 is pressurised, or active, the vehicle is in a normal state of operation or in a purging state of operation, in both states fuel pressure from main fuel tank 14 causing fuel to flow from junction A through first check-valve 142, junction E, and supply fuel hose 20, to engine 12. In the purging state, valve 146 is open and fuel pressure from main fuel tank 14 also causes fuel to flow from junction B through a second check-valve 144, reserve fuel tank 110, valve 146, and supply fuel hose 20, to engine 12, thereby purging the system. After the purging state valve 146 is closed and reserve fuel tank 110 is full.

Electrical circuit 160 includes a battery 162, electric switch 130, a timer 166 connected to electric switch 130, and a reserve mode indicator 168, illustratively a light. In the present embodiment, electrical circuit 160 is connected to the solenoid of valve 146. When the switch is closed, current flows from battery 162 through the solenoid valve, causing it to open. Closing of the switch also starts timer 166 and energizes indicator 168.

Timer 166 and indicator 168 can be integrated with actuator 130 in one device. Alternatively, timer 166 and indicator 168 may be provided separately.

In some embodiments, actuator 130 and valve 146 are integrated in one device. The single device may be a mechanically actuated valve.

Figure 4:
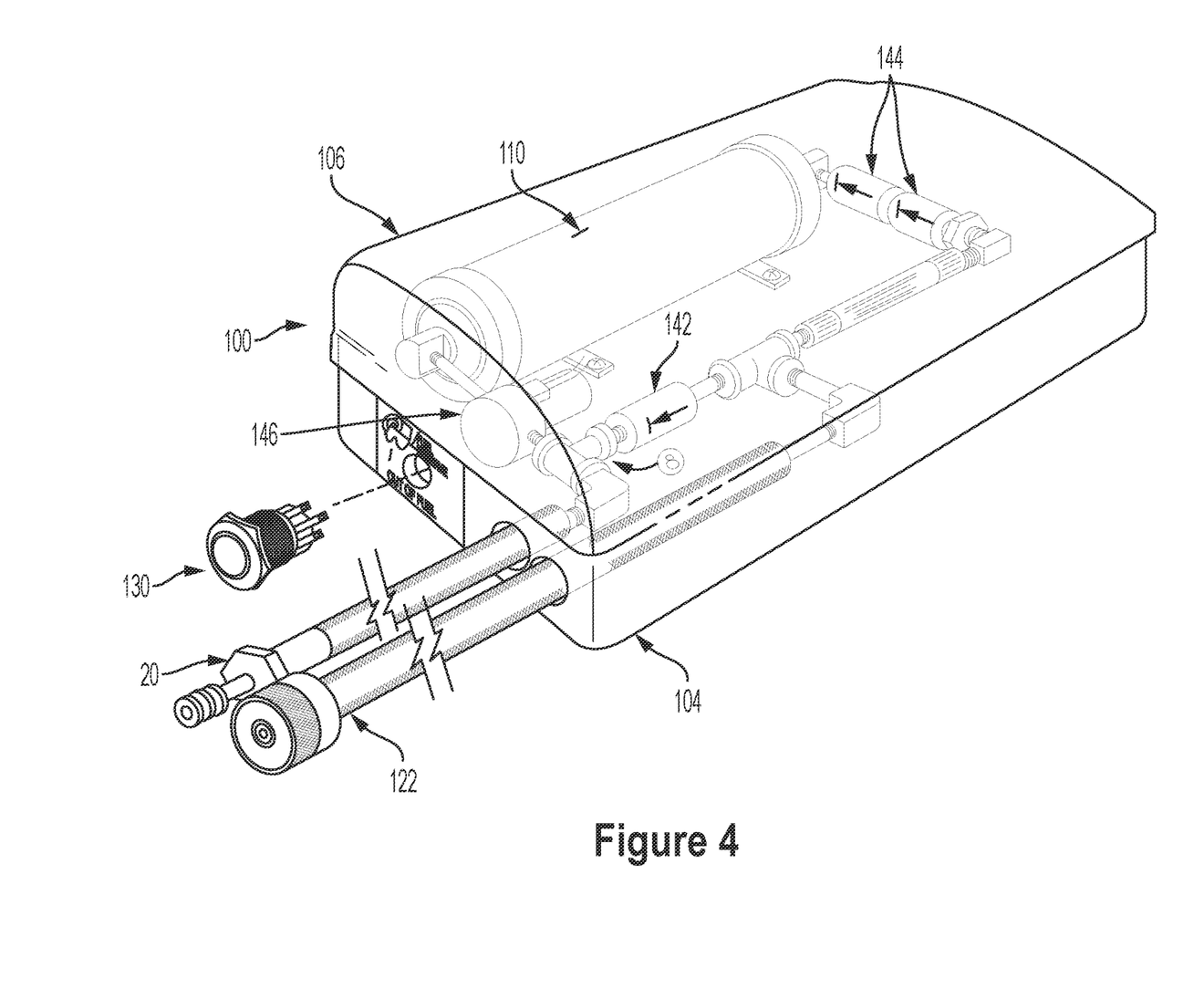
FIG. 4 is a perspective view of another embodiment of the FTRC module of FIG. 1.

FIG. 4 is a perspective view of another embodiment of FTRC module 100. In the present embodiment, two check-valves 144 are used. The inventors observed serendipitous occurrence of a "dribbling" event when only one check-valve 144 is used that causes fuel from reserve tank 100 to slowly bleed fuel to the engine, emptying and thus reducing the reserve fuel capacity of reserve fuel tank 100. Adding a second check-valve 144 provides a positive shut-off and prevents dribbling.

Figure 5:
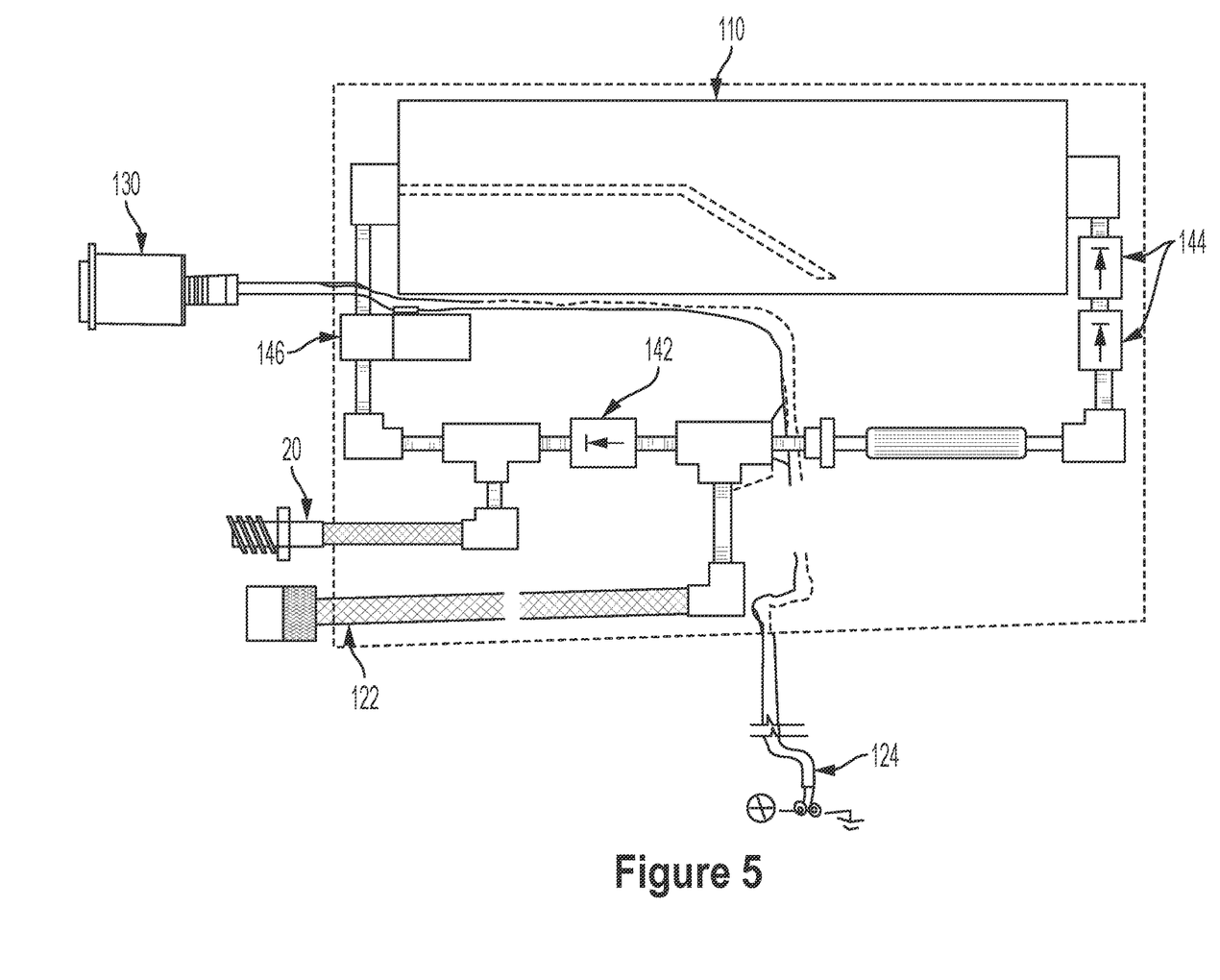
FIG. 5 is a top view of the FTRC module of FIG. 4.

As shown in FIG. 4, fluid circuit 140 comprises a number of T- and elbow connectors coupling the check valves, valve 146, and reserve fuel tank 110. FIG. 5 is a top view of the embodiment of the FTRC module of FIG. 4. Preferably the T- and elbow connectors, and any conduits therebetween (collectively, "fittings"), are made of brass. Preferably the fittings comprise a common internal diameter.

In operation, when fuel from main fuel tank 14 is exhausted, engine 12 shuts down. To restart the engine in the reserve mode, the user engages actuator 130 to open valve 146, and indicator 168 indicates the reserve mode of operation is active for a period of time set by the timer. When the timer runs out, valve 146 closes and the reserve fuel stops flowing, shutting down engine 12 after the predetermined time set by the timer. Of course the timer could be provided by an integrated circuit in a chip programmed with the predetermined time or, a first predetermined time to set the purging mode duration and a second predetermined time to set the reserve mode operation. The chip, or controller, can include outputs to control the valve and various indicators and inputs to receive signals from a switch or switches configured for actuating the valve, either for the predetermined time, or the first and second predetermined times.

In some embodiments of the FTRC module, inlet and outlet ports are connected to base 104 providing junctions B and E. Fittings inside the FTRC module fluidly connect the inlet and outlet ports to the check-valves and the valve. In such embodiments external hoses connect the inlet and outlet ports to the engine and the main fuel tank.

Figure 6:
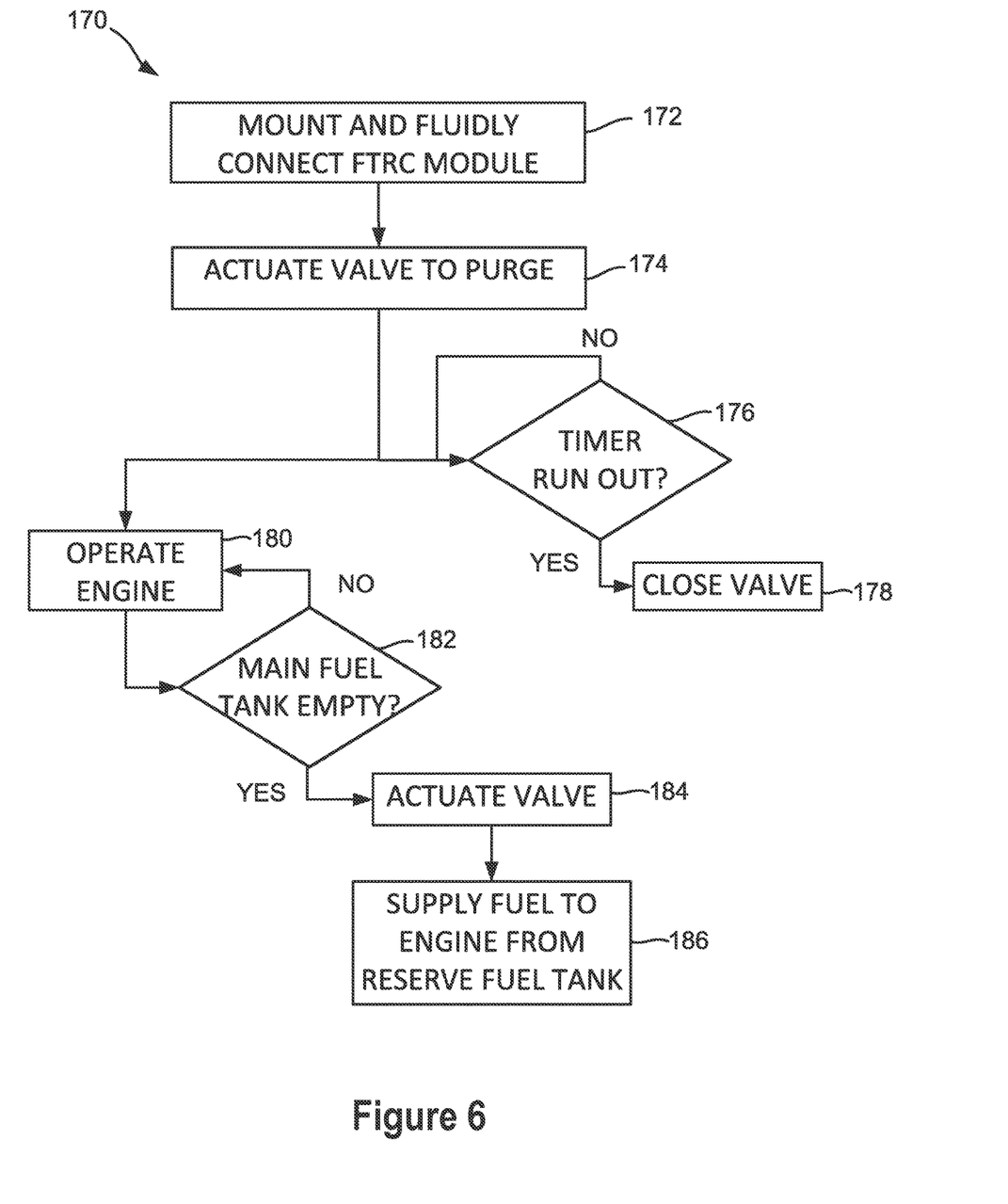
FIG. 6 is a flowchart depicting an embodiment of the operation of the FTRC module.

An embodiment of a method of operating a vehicle with a FTRC module will now be described with reference to a flowchart 170 depicted in FIG. 6. The method begins, at 172, by mounting and fluidly connecting the FTRC module to the engine and main fuel tank of a vehicle.

At 174, valve 146 is actuated to purge the fluid lines and fill the reserve fuel tank. The fluid lines are purged to the engine and not the environment. Purging may be necessary because air may have entered the fluid subsystem and condensation may have been formed due to temperature differentials and changes in fuel pressure. As described above, valve 146 may be a solenoid valve actuated by an electric switch when a user actuates the switch.

A timer may be started when valve 146 is actuated. At 176, the electrical subsystem waits for time to run out, and when the time runs out the timer causes the electrical switch to close, at 178, allowing the reserve fuel tank to remain full after the lines have been purged.

Meanwhile, at 180, the engine can be operated because it receives fuel from the main fuel tank and or the reserve fuel tank prior to the closing of valve 146.

The engine can be operated until the main fuel tank empties, at 182, at which time the engine is starved of fuel and stops, potentially "dead in the isle".

The operator may, at 184, actuate valve 146 to allow reserve fuel, at 186, to supply the engine. The check-valves prevent backflow to the main fuel tank. The vehicle may now be operated by a period of time set by the timer that controls valve 146.

The FTRC module can be fluidly connected to the engine at any time, including before the main fuel tank is empty or after it is refilled or replaced.

Valve 146 may be a mechanical or pneumatically operated valve using any known mechanically or pneumatically actuated valve, which are well known.

In one variation, two timers, with respective electrical switches, may be used in parallel, one timer/switch combination to control purging time after connection of the FTRC module to the main fuel tank and another to control duration of the reserve mode of operation. In another variation, a switch/timer combination may be used to control purging and a switch without timer may be used to engage the reserve mode of operation, in which case the engine may run until the reserve fuel tank empties. In a third variation, a switch without timer may be used to control purging and engage the reserve mode of operation. Without a timer, however, it is possible for the operator of the vehicle to forget to switch the valve off, thereby running the engine without reserving fuel in the reserve fuel tank. A single timer/switch combination is simpler and less expensive and therefore preferred.

Figure 7:
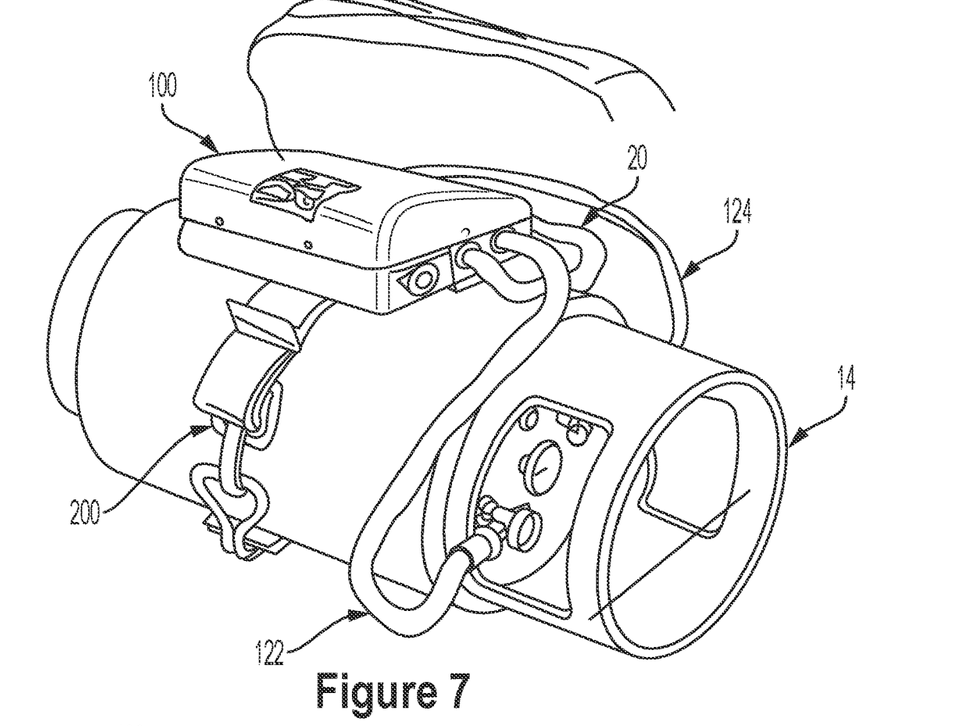
FIGS. 7 to 9 are perspective views of embodiments of the FTRC module of FIG. 1 showing different securement arrangements.
Figure 8:
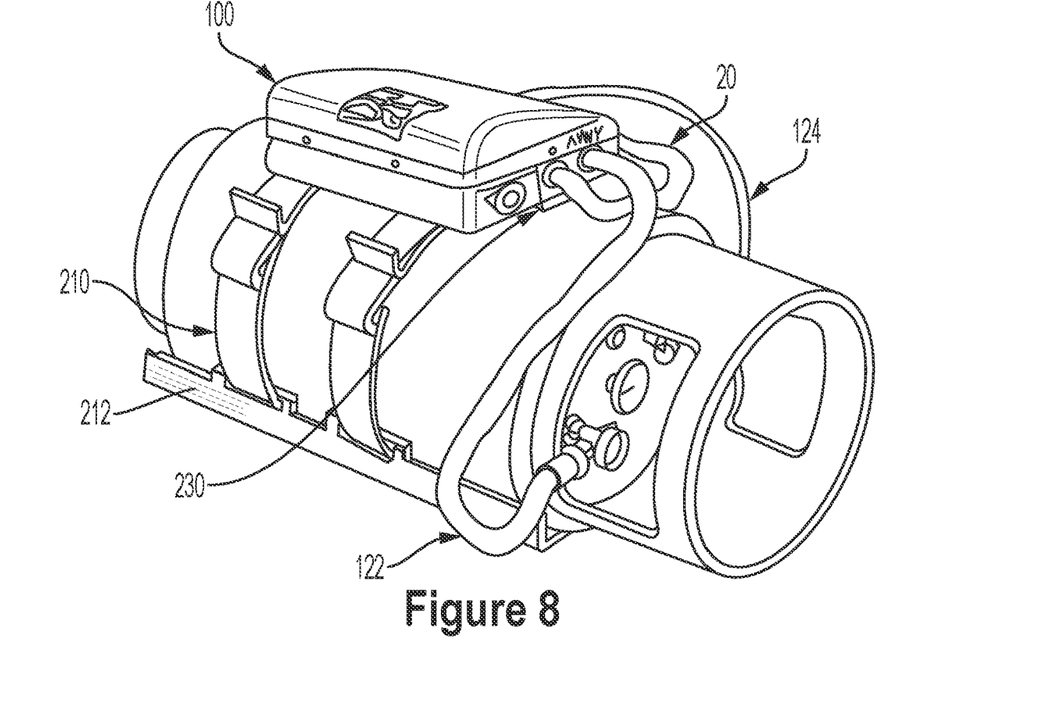
Figure 9:
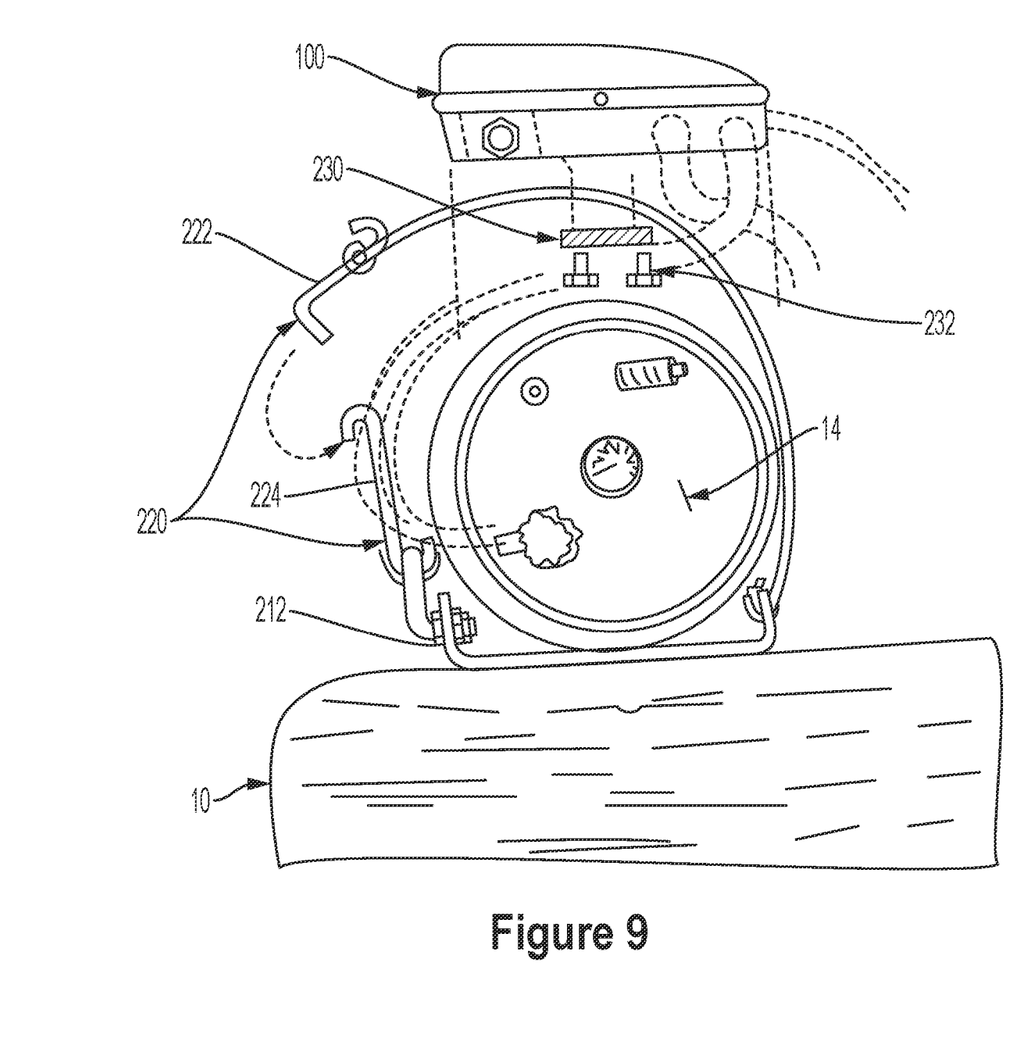

FIGS. 7 to 9 are perspective views of embodiments of the FTRC module showing different securement arrangements. Fork trucks may utilize single straps 200 (FIG. 7), dual straps 210 (FIG. 8), or steel belts 220 (FIG. 9) to secure the main fuel tank 14 to the fork truck. Some form of a quick-disconnect mechanism is provided to facilitate tank removal. As shown, the quick-disconnect mechanism may involve a pivotable hook 224 and a loop 222 on the end of a strap. A tank tray 212 may be provided to secure the main fuel tank 14. These quick-disconnect mechanisms are well known.

In one embodiment, a slider plate 230 is placed between the straps and main fuel tank 14 and secured to the FTRC module at both ends to prevent that the FTRC module slides off laterally. Fasteners 232 are provided to fasten slider plate 230 to FTRC module 100. Example fasteners include screws, bolts, and rivets. Advantageously, the same slider plate 230 may be used with any strap system. In a dual strap system, fasteners (one or more) may be provided between the straps. The fasteners 232 pass through through-holes in the slider plate 230 and are then fastened to the base 104.

In a variation of the present embodiment, a self-clinching fastener, e.g. a weldnut or PEM™ fastener, is embedded into the base 104. Broadly defined, a self-clinching fastener (also known as clinch or captive fastener) is any device, usually threaded, that, when pressed into ductile metal, displaces the host material around the mounting hole, causing it to cold flow into a specially designed annular recess in the shank or pilot of the fastener. A serrated clinching ring, knurl, ribs or hex head prevents the fastener from rotating in the host material once it has been properly inserted. Thus, self-clinching fasteners become a permanent part of the base 104 after installation. The fasteners 232 are screwed into the self-clinching fastener to secure the slider plate 230 to the base 104. Installing and tightening the fasteners 232, thus, will clamp the retaining straps 200 in FIG. 7, or 210 in FIG. 8, to the module 100. Self-clinching fastener installation methods include pressing, broaching, or welding.

The foregoing securement arrangements advantageously permit securement of a reserve fuel tank to a fork truck without modifying the fork truck, in particular without drilling holes or welding components to the safety cage, which may be impermissible, while removably mounting the reserve fuel tank to the vehicle below the rear line of sight of the operator.

We claim:

1. A reserve fuel tank retention and control (RTRC) module for a vehicle including an engine and a main fuel tank containing a fuel, the RTRC module comprising:
   a fuel supply hose adapted to fluidly connect the RTRC module and the engine;
   a fuel intake hose adapted to fluidly connect the RTRC module and the main fuel tank;
   a reserve fuel tank;
   a first fluid circuit fluidly connecting the fuel supply hose and the fuel intake hose with a first check-valve therebetween, the first check-valve allowing flow of the fuel from the fuel intake hose to the fuel supply hose;
   a second fluid circuit fluidly connecting the fuel supply hose and the fuel intake hose, the second fluid circuit including a second check-valve between the fuel intake hose and the reserve fuel tank and a valve between the reserve fuel tank and the fuel supply hose;
   an actuator operable to open the valve to allow fuel to flow from the reserve fuel tank to the engine;
   a housing including a base and a lid secured to the base, wherein the reserve fuel tank, the first check-valve, the second check-valve, and the valve are positioned within the housing; and
   a sliding plate adapted to be secured to the base with at least one strap of the vehicle between the sliding plate and the base to secure the RTRC module to the vehicle when the sliding plate is secured to the base.

2. The module of claim 1, wherein the base comprises a plurality of self-clinching fasteners adapted to receive fasteners therein, the fasteners passing through through-holes in the sliding plate to secure the sliding plate to the base.

3. The module of claim 2, wherein the base and the lid each have a wall of uniform wall thickness sufficient to form an impact resistant structure, wherein the wall thickness of the base is sufficiently thick to enable securement of the self-clinching fasteners therein.

4. The module of claim 1, further comprising a third check-valve in tandem with the second check-valve, the third check-valve fluidly connected between the second check-valve and the reserve fuel tank.

5. The module of claim 1, further comprising an indicator connected to the second fluid circuit between the reserve fuel tank and the fuel supply hose, the indicator configured to indicate a reserve mode of operation responsive to the valve being actuated to open.

6. The module of claim 1, wherein the valve comprises a solenoid valve and the actuator comprises an electric switch operable to open the valve.

7. The module of claim 6, further comprising a timer operable to maintain the valve in an open state for a predetermined time responsive to the electric switch causing the valve to open.

8. The module of claim 7, wherein the actuator comprises an electric switch including the indicator and the timer, in a single device.

9. The module of claim 1, wherein the module is sized and configured to be portable.

10. A method of operating a vehicle including an engine and a main fuel tank containing a fuel, the method comprising:
    mounting a reserve fuel tank retention and control (RTRC) module onto the vehicle;
    fluidly connecting the RTRC module to the engine and to the main fuel tank;
    actuating a valve of the RTRC module for a predetermined time to purge moisture in a fuel supply hose into the engine; and
    upon the main fuel tank becoming empty, actuating the valve to allow fuel from the reserve fuel tank to supply the engine,
    wherein actuating the valve to allow fuel from the reserve fuel tank to supply the engine comprises actuating the valve for the predetermined time.

11. The method of claim 10, wherein actuating a valve of the RTRC module for a predetermined time comprises engaging a timer switch electrically connected to the valve, the timer switch maintaining the valve open for the predetermined time.

12. The method of claim 10, wherein fluidly connecting the RTRC module to the engine and to the main fuel tank comprises fluidly connecting a fuel supply hose of the RTRC module to the engine and fluidly connecting a fuel intake hose of the RTRC module to the main fuel tank.

13. A method of operating a vehicle including an engine and a main fuel tank containing a fuel, the method comprising:
- mounting a reserve fuel tank retention and control (RTRC) module onto the vehicle;
- fluidly connecting the RTRC module to the engine and to the main fuel tank;
- actuating a valve of the RTRC module for a predetermined time to purge moisture in a fuel supply hose into the engine; and
- upon the main fuel tank becoming empty, actuating the valve to allow fuel from the reserve fuel tank to supply the engine,
- wherein the predetermined time is a first predetermined time, and wherein actuating the valve to allow fuel from the reserve fuel tank to supply the engine comprises actuating the valve for a second predetermined time different than the first predetermined time.

14. The method of claim 13, wherein the first predetermined time defines a duration of a purging mode of operation, and wherein the second predetermined time defines a duration of a reserve mode of operation.

15. The method of claim 10, wherein the RTRC module comprises:
- the valve;
- the fuel supply hose, the fuel supply hose adapted to fluidly connect the RTRC module and the engine;
- a fuel intake hose adapted to fluidly connect the RTRC module and the main fuel tank;
- a first fluid circuit fluidly connecting the fuel supply hose and the fuel intake hose with a first check-valve therebetween, the first check-valve allowing flow of the fuel from the fuel intake hose to the fuel supply hose;
- a second fluid circuit fluidly connecting the fuel supply hose and the fuel intake hose, the second fluid circuit including a second check-valve between the fuel intake hose and the reserve fuel tank and a valve between the reserve fuel tank and the fuel supply hose; and
- an actuator operable to open the valve to allow fuel to flow from the reserve fuel tank to the engine.

16. The method of claim 15, wherein the RTRC module comprises:
- a housing including a base and a lid secured to the base, wherein the first check-valve, the second check-valve, and the valve are positioned within the housing; and
- a sliding plate adapted to be secured to the base with at least one strap of the vehicle between the sliding plate and the base to secure the RTRC module to the vehicle when the sliding plate is secured to the base.

17. The method of claim 13, wherein the RTRC module comprises:
- a housing including a base and a lid secured to the base, a first check-valve, and a second check-valve, wherein the reserve fuel tank, the first check-valve, the second check-valve, and the valve are positioned within the housing; and
- a sliding plate adapted to be secured to the base with at least one strap of the vehicle between the sliding plate and the base to secure the RTRC module to the vehicle when the sliding plate is secured to the base.

* * * * *